Patented Dec. 28, 1948

2,457,375

UNITED STATES PATENT OFFICE 2,457,375

PURIFICATION OF PTEROIC ACID AMIDES

Brian L. Hutchings, Montvale, N. J., assignor to American Cyanamid Company, New York, N. Y., a corporation of Maine No Drawing. Application May 11, 1946, Serial No. 669,099

12 Claims. (Cl. 260—251)

This invention relates to a process of purifying crude reaction mixtures containing synthetic folic acid and related products.

The substance called folic acid is a growth-promoting material having vitamin-like properties. It is known to have a stimulating effect upon the growth of chicks, rats, and other animals and upon bacteria, including *Streptococcus lactis*, *Lactobacillus casei*, and others. The product, isolated from natural sources, has been variously designated as folic acid, vitamin Bc, factor U, L. casei factor, chick growth factor, and the like. Lately, a substance having identical biological activity has been synthesized and shown to be effective in stimulating haemoglobin formation and in the treatment of agranulocytosis, sprue, and other related diseases.

The synthetic production of substances having the identical, or analogous, biological activity of folic acid derived from natural sources has been achieved by reacting 2,4,5-triamino-6-hydroxypyrimidine, an amino acid amide of para-aminobenzoic acid such as para-aminobenzoyl glutamic acid, and an appropriate three carbon compound having reactive aldehyde and/or halogen groups, such as particularly alpha, beta-dibromopropionaldehyde.

The most important biologically active product of the reaction bears the chemical name N-[4-{[(2-amino-4-hydroxy-6-pyrimido[4,5-b]pyrazyl) methyl]-amino}benzoyl] glutamic acid. Other closely related products having biological activity in varying degree may be prepared by the process by using suitable starting materials in which the glutamic acid residue of the para-aminobenzoyl glutamic acid intermediate is replaced with another amino acid or a polypeptid thereof, such, for example, being para-aminobenzoylglutamyl - glutamylglutamic acid. Several of these synthetic products, particularly the glutamic acid amides of 4-{[(2-amino-4-hydroxy-6-pyrimido [4,5-b]pyrazyl) methyl] amino}benzoic acid having one, two, three, and more glutamic acid radicals connected by a peptide linkage, possess activity similar to folic acid derived from natural sources. Because of the complexity of the nomenclature of these compounds, the simplified term "pteroic acid" has been suggested and accepted by chemists in the field to designate the fundamental group 4-{[(2-amino-4-hydroxy-6-pyrimido [4,5-b] pyrazyl) methyl] amino}benzoic acid. For purposes of convenience this simplified term will be used hereinafter.

The chemistry of the process by which these glutamic acid amides of pteroic acid are prepared is highly complex, particularly inasmuch as the different intermediates mentioned above may react in several different ways. Chemists familiar with the chemistry of heterocyclic, organic compounds of this type would expect, and it has been found by experience, that numerous side reactions occur along with, or following, the principal reaction. Accordingly, the reaction product contains a relatively large proportion of undesired substances, including unreacted intermediates, condensation and/or polymerization products of two or more of the intermediates, position isomers, oxidation products, various hypothetical degradation products, products of hydrolysis and the like. Many of these unidentified products contain a pyrimidopyrazine nucleus and may be designated generally as pterins. Some of the by-products of the reaction may be harmful and, inasmuch as the product is to be used as a therapeutic agent, it is obvious that these pterins should be separated from the biologically active material.

Although folic acid has been isolated from natural sources, with considerable difficulty, however, the processes useful for this purpose have not been found to be suitable for separating synthetic folic acid from the various impurities associated with it as a result of the side reactions just mentioned. Unfortunately, many of the pterins associated with synthetic folic acid in the crude reaction product possess some of the same chemical and physical properties of the desired biologically active product and it has been found extremely difficult to separate the impurities without causing an alarming loss of the active material. It is, therefore, one of the objects of the present invention to provide a method of purifying crude reaction mixtures containing glutamic acid amides of pteroic acid to such degree that the purified product may be used for medical purposes.

The present invention is based in part upon my discovery that the alkaline earth metal salts of the by-product pterins are more water-insoluble than the alkaline earth-metal salts of the glutamic acid amides of pteroic acid and that this difference is accentuated in alcoholic solution.

In carrying out the process of the present invention I prefer to prepare a solution of the crude reaction product at a pH above about 8 using an alkali to solubilize the glutamic acid amides of pteroic acid and other pterins in the reaction mixture. The solution is then treated with a water soluble alkaline earth-metal compound to form the alkaline earth-metal salts of glutamic acid amides of pteroic acid and the pterin associated therewith. Many of the undesired pterins precipitate as their alkaline earth-metal salt and can be removed by filtration.

The solubility of these alkaline earth-metal salts may be further depressed by the addition of water miscible alcohols such as methyl, ethyl, isopropyl alcohol etc. to the solution, either before or after precipitation as the barium salt. The amount of alcohol should be carefully governed in that more than about 25% of alcohol also depresses the solubility of the alkaline earth-metal salts of the glutamic acid amides of pteroic acid to such an extent that much of it is likewise precipitated and lost with the other insoluble pterins.

Ordinarily I prefer to add sufficient alcohol to the solution of alkaline earth-metal salts to give the solution a concentration of from about 10% to 20% by weight of alcohol. When isolating biologically active pteroyl glutamic acid derivatives having more than one glutamic acid residue in the molecule, such as N-[4-{[(2-amino-4-hydroxy-6-pyrimido [4,5-b] pyrazyl) methyl] amino}benzoyl] glutamylglutamylglutamic acid, less alcohol should be used inasmuch as the alkaline earth-metal salts of these polypeptids are more insoluble and excess alcohol tends to decrease their solubility too much. In such cases, therefore, I use from about 5% to 10% of alcohol in the solution to depress the solubility of the inactive pterins associated therewith.

As a result of the selective precipitation of the unwanted pterins in the form of their alkaline earth-metal salts it is possible to remove most of the impurities with but a nominal loss of the active product. Further purification may then be accomplished either by treatment with activated charcoal or by extraction of the free pteroyl glutamic acid salts to remove pterins with other organic solvents. Inasmuch, however, as activated charcoal absorbs the pteroyl glutamic acid almost as efficiently as it does the contaminating pterins, this technique is not desirable except possibly as a finishing operation. I prefer, therefore, that further purification be by means of organic solvents.

After most of the contaminating pterins have been removed by precipitation as alkaline earth-metal salts, the product may be further purified by butanol extraction. I have discovered, and this discovery is also an important part of the present invention, that the contaminating pterins, which are sought to be removed from association with the pteroyl glutamic acid, are more soluble in butanol than is pteroyl glutamic acid. The aqueous solution of pteroyl glutamic acid is extracted with butanol at a pH between about 6 to 7.5 to remove most of the remaining pterins from the partially purified pteroyl glutamic acid. Several such extractions may be required to reduce the contaminants to the desired level. It is then feasible to treat the aqueous solution of pteroyl glutamic acid with activated charcoal to remove the remaining pterins. Pteroyl glutamic acid may then be recovered from solution by precipitation at pH 3 to obtain a product of sufficient purity for most medicinal uses.

*Example*

500 mg. of a crude reaction product containing 109.8 mg. of pteroyl glutamic acid, the remainder being pterins and other products of the reaction, is dissolved in 300 ml. of 0.2 N sodium hydroxide solution. Solid barium chloride is then added to 0.2 N. The insoluble precipitate which forms is then removed by filtration and ethyl alcohol is added to the filtrate to a 20% concentration. The precipitate is then removed by filtration and discarded.

The filtrate from the above is treated with enough sulfuric acid to precipitate the barium present as barium sulfate, an excess of sodium hydroxide being added from time to time, as necessary, to keep the pH of the solution at above 8. The filtrate is then diluted to 1200 ml. and adjusted to a pH of about 7 at which more of the undesired pterins precipitate. The solution at this dilution preferably has a concentration of about 50 gammas of pteroyl glutamic acid per milliliter. The precipitation of insoluble pterins at neutrality should be from a solution less concentrated in pteroyl glutamic acid than about 200 gammas per milliliter in that the precipitate tends to carry down with it much of the pteroyl glutamic acid when the pteroyl glutamic acid is present at high concentrations.

The filtrate at this stage of the process contains 61.8 mg. of pteroyl glutamic acid and only 31.05 mg. of the undesired pterins. As will be evident, this represents a considerable purification of the crude material.

The pterins may be removed from the filtrate above by treatment with 200 mg. of Norite A. However, the activated charcoal absorbs an approximately equal amount of the pteroyl glutamic acid and it is preferred that this absorption step be omitted or reserved for final purification.

The preferred procedure is to extract the aqueous solution at pH 7 with ten volumes of butanol. This extraction is repeated three times and removes approximately 90% of the pterins associated with the pteroyl glutamic acid. A small amount of activated charcoal, about 1 g. of charcoal for each 80 mg. of undesired pterins, is then added to the aqueous solution and the solution filtered. Any residual pigment present may be removed, with some loss of pteroyl glutamic acid, by further treatment with charcoal.

The aqueous solution is then concentrated in vacuum so that pteroyl glutamic acid is present at a concentration of 200 to 400 gammas per cubic centimeter. The insoluble product, if any, at this stage of the operation is dissolved by warming the solution which is then adjusted to a pH of about 3. At this hydrogen ion concentration pteroyl glutamic acid has a minimum solubility in water and readily precipitates from solution. It may, if desired, be recrystallized from water. The product thus obtained has a purity as high as 94%.

Some economy in the use of butanol may be obtained by carrying out the extraction at an elevated temperature.

What we claim is:

1. A process of separating glutamic acid amides of 4-{[(2-amino-4-hydroxy-6-pyrimido [4,5-b] pyrazal) methyl] amino} benzoic acid from related pterins in association therewith, which comprises the step of converting the pterins in the mixture to alkaline earth-metal salts and separating the water-insoluble materials from the water-soluble substances.

2. A process of separating glutamic acid amides of 4-{[(2-amino-4-hydroxy-6-pyrimido [4,5-b] pyrazyl) methyl] amino} benzoic acid from related pterins in association therewith which comprises the steps of converting the pterins in the mixture to barium salts and separating the water-insoluble materials from the water-soluble substances.

3. A process of separating glutamic acid amides of 4-{[(2-amino-4-hydroxy-6-pyrimido [4,5-b] pyrazyl) methyl] amino} benzoic acid from related pterins in association therewith which comprises the step of converting the pterins in the mixture to calcium salts and separating the water-insoluble materials from the water-soluble substances.

4. A process of separating glutamic acid amides of 4-{[(2-amino-4-hydroxy-6-pyrimido [4,5-b] pyrazyl) methyl] amino} benzoic acid from related pterins in association therewith which comprises the step of converting the pterins in the mixture to alkaline earth-metal salts and subjecting the mixed salts to the action of an aqueous solution containing not more than about 25% of a lower aliphatic alcohol and separating the water-insoluble materials from the water-soluble substances.

5. A process of separating N-[-4-{[(2-amino-4-hydroxy-6-pyrimido [4,5-b] pyrazyl) methyl] amino} benzoyl] glutamic acid having the formula:

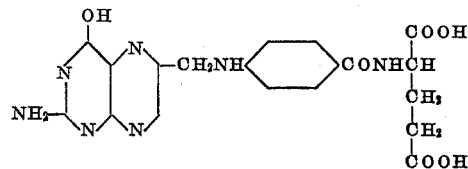

from related pterins in association therewith which comprises the step of converting the pterins in the mixture to barium salts and subjecting the mixed salts to the action of an aqueous solution containing not more than about 25% of ethyl alcohol and separating the water-insoluble materials from the water-soluble substances.

6. A process of separating N-[-4-{[(2-amino-4-hydroxy-6-pyrimido [4,5-b] pyrazyl) methyl] amino} benzoyl] glutamic acid having the formula:

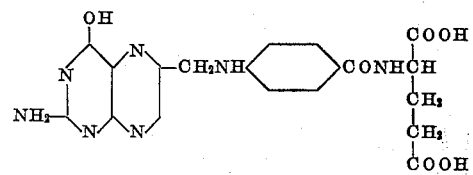

from related pterins in association therewith which comprises the step of converting the pterins in the mixture to alkaline earth-metal salts, subjecting the mixed salts to the action of an aqueous solution containing not more than about 25% of a water miscible alcohol and separating the insoluble materials from the soluble substances, eliminating alkaline earth-metal from the solution and thereafter extracting the water-soluble aqueous fraction with butanol to remove butanol-soluble products.

7. A process of separating N-[-4-{[(2-amino-4-hydroxy-6-pyrimido [4,5-b] pyrazyl) methyl] amino} benzoyl] glutamic acid having the formula:

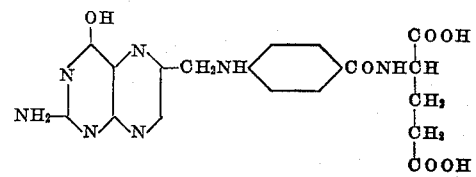

from related pterins in association therewith which comprises the step of converting the pterins in the mixture to calcium salts, subjecting the mixed salts to the action of an aqueous solution containing not more than about 25% of ethyl alcohol and separating the insoluble materials from the soluble substances, eliminating calcium from the solution and thereafter extracting the water-soluble aqueous fraction with butanol to remove butanol-soluble products.

8. A process of separating N-[4-{[(2-amino-4-hydroxy-6-pyrimido [4,5-b] pyrazyl) methyl] amino} benzoyl] glutamic acid having the formula:

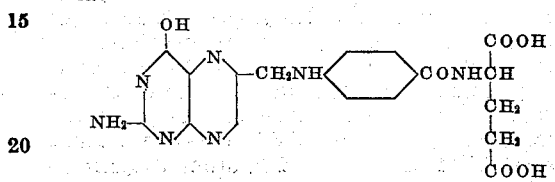

from related pterins in association therewith which comprises the step of treating an aqueous solution of the mixture with a water-soluble calcium compound to convert the soluble pterins to calcium salts and separating from the soluble fraction those products insoluble in an aqueous solution containing from 5 to 20% by weight of ethyl alcohol.

9. A process of separating N-[4-{[(2-amino-4-hydroxy-6-pyrimido [4,5-b] pyrazyl) methyl] amino} benzoyl] glutamylglutamylglutamic acid having the formula

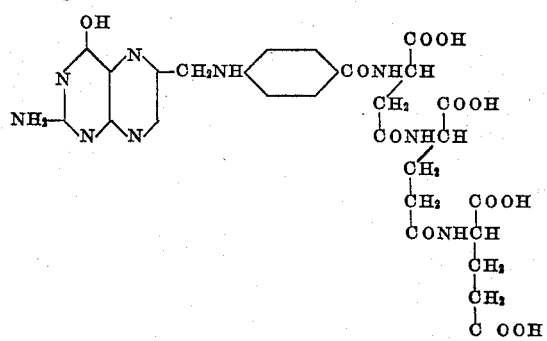

from related pterins in association therewith which comprises the step of treating an aqueous solution of the mixture with a water-soluble barium compound to convert the soluble pterins to barium salts and separating from the soluble fraction those products insoluble in an aqueous solution containing not more than about 10% of ethyl alcohol.

10. A process of separating N-[4-{[(2-amino-4-hydroxy-6-pyrimido [4,5-b] pyrazyl) methyl] amino} benzoyl] glutamic acid from related pterins in association therewith which comprises the step of treating an aqueous solution of the mixture with a water-soluble barium compound to convert the soluble pterins to barium salts and separating from the soluble fraction those products insoluble in an aqueous solution containing from 5 to 20% by weight of a water miscible alcohol, eliminating barium from the solution by precipitation as barium sulfate, adjusting the hydrogen ion concentration of the solution to about pH 7 and separating insoluble pterins therefrom, extracting butanol-soluble products from the solution by extraction with butanol and thereafter adjusting the hydrogen ion concentration of the aqueous phase to about pH 3 to obtain a precipitate of N-[4{[(2-amino-4-hydroxy-6-pyrimido [4,5-b] pyrazyl) methyl] amino} benzoyl] glutamic acid.

11. A process of separating N-[4-{[(2-amino-4-hydroxy-6-pyrimido [4,5-b] pyrazyl) methyl] amino} benzoyl] glutamic acid from related pterins in association therewith which comprises the step of treating an aqueous solution of the mixture with a water-soluble calcium compound to convert the soluble pterins to calcium salts and separating from the soluble fraction those products insoluble in an aqueous solution containing from 5 to 20% by weight of a water miscible alcohol, eliminating calcium from the solution by precipitation as calcium sulfate, adjusting the hydrogen ion concentration of the solution to about pH 7 and separating insoluble pterins therefrom, extracting butanol-soluble products from the solution by extraction with butanol and thereafter adjusting the hydrogen ion concentration of the aqueous phase to about pH 3 to obtain a precipitate of N-[4-{[(2-amino-4-hydroxy-6-pyrimido [4,5-b] pyrazyl) methyl] amino} benzoyl] glutamic acid.

12. A process of separating N-[-4-{[(2-amino-4-hydroxy-6-pyrimido [4,5-b] pyrazyl) methyl] amino} benzoyl] glutamylglutamic acid having the formula:

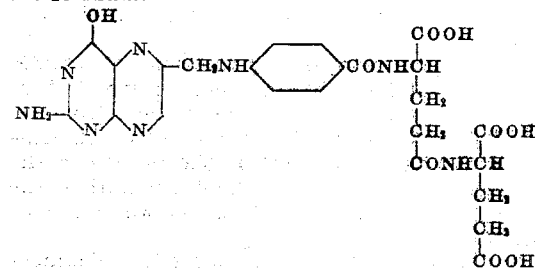

from related pterins in association therewith which comprises the step of treating an aqueous solution of the mixture with a water-soluble calcium compound to convert the soluble pterins to calcium salts and separating from the soluble fraction those products insoluble in an aqueous solution containing not more than about 10% of ethyl alcohol.

BRIAN L. HUTCHINGS.

No references cited.